Aug. 28, 1956 W. H. TABOR Re. 24,207
PENDANT TYPE BOBBIN HOLDER
Original Filed Sept. 9, 1952
Fig. 1.
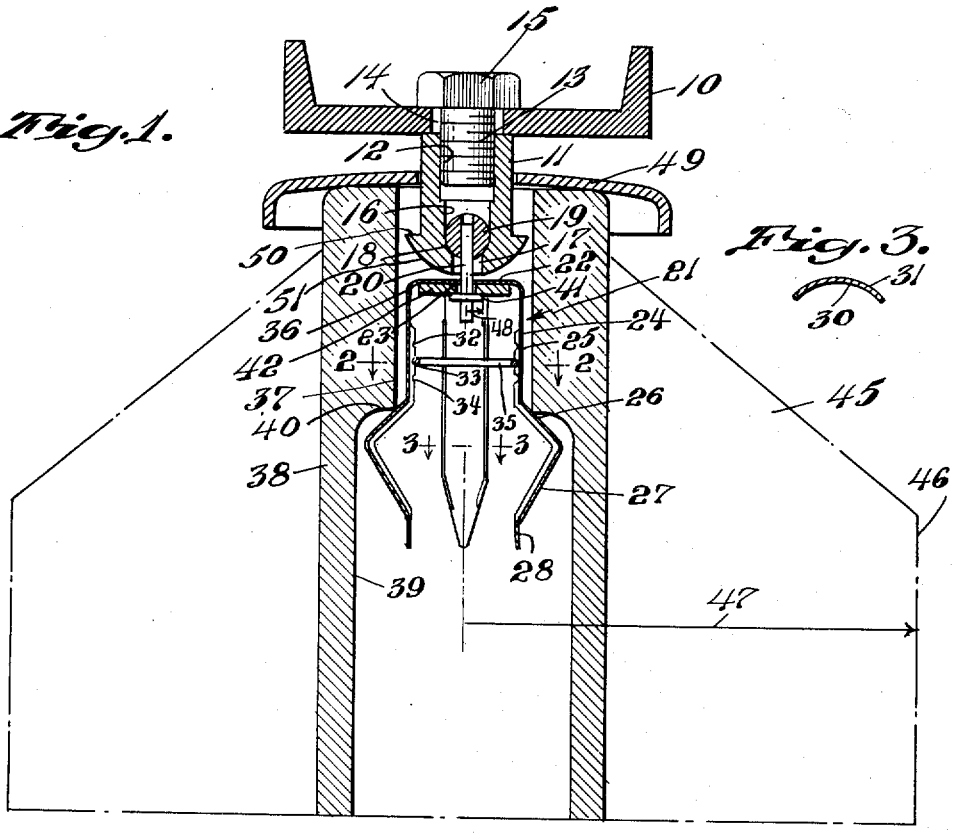
Fig. 3.
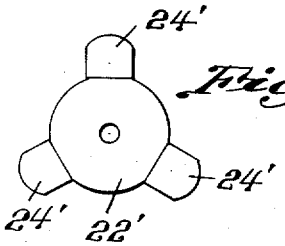
Fig. 6.
Fig. 4.
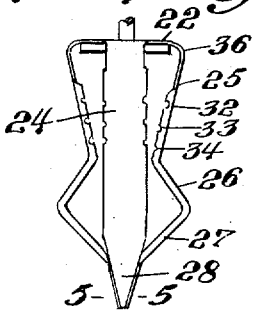
Fig. 2.
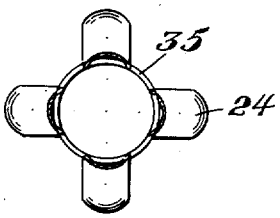
Fig. 5.
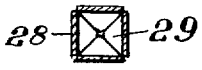
INVENTOR.
Warner H. Tabor
BY
Barlow & Barlow
ATTORNEYS.

United States Patent Office

Re. 24,207

Reissued Aug. 28, 1956

24,207

PENDANT TYPE BOBBIN HOLDER

Warner H. Tabor, Bristol, R. I., assignor to Dixon Corporation, a corporation of Rhode Island Original No. 2,712,909, dated July 12, 1955, Serial No. 308,613, September 9, 1952. Application for reissue April 27, 1956, Serial No. 586,337

13 Claims. (Cl. 242—130)

Matter enclosed in heavy brackets [ ] appears in the original patent but forms no part of this reissue specification; matter printed in italics indicates the additions made by reissue.

This invention relates to a bobbin holder of the type used for supporting a bobbin from the under side of the top board of the creel of a spinning frame or a roving frame.

Pendant type bobbin holders usually have been supported rotatably by means of ball bearings located outside of the bobbin and directly beneath the top board of the creel with a part which extends into the open center of the bobbin depending from this ball bearing for frictionally engaging the inner walls of the bobbin. There is considerable lint present around the creel of a spinning frame and this lint settles on the ball bearings and their supports, thus increasing friction of the bearing, and is difficult to clean. Further, the use of a ball bearing requires that a brake be used to retard turning.

One of the objects of this invention is to completely house the bearing for the bobbin holder within the bobbin so that it will be protected from lint and thus will not be hampered by friction which results therefrom.

Another object of the invention is to provide a device which will turn easily without the necessity of providing ball bearings, which are expensive.

Another object of the invention is to provide an arrangement which will need no brake to control the rotation of the package.

Another object of the invention is to provide an arrangement so that the resiliency of the holding arms which enter the bobbin may be varied.

With these and other objects in view, the invention consists of certain novel features of construction as will be more fully described and particularly pointed out in the appended claims.

In the accompanying drawings:

Figure 1 is a sectional on an enlarged scale showing a portion of the bobbin as secured in position by a holder embodying this invention and illustrating in dot-dash lines a fragmental portion of the yarn package on the bobbin;

Figure 2 is a section on line 2—2 of Figure 1;

Figure 3 is a section on line 3—3 of Figure 1;

Figure 4 is an elevation of the bobbin holding member in contracted position;

Figure 5 is a sectional view on line 5—5 of Figure 4 of the resilient arms of the bobbin holding member in contacted position;

Figure 6 is a plan view of a modified form of holder having three instead of four prongs.

With reference to the drawings, 10 designates the top board of a creel of a spinning frame or the like from which my bobbin holder is suspended in pendant relation.

The bobbin holder comprises a head 11 having a threaded bore 12 into which screw 13 extends through opening 14 in the top board 10 of the creel of a spinning frame. The head 15 of the screw engages the margin about the hole 14 and serves to draw the head 11 up against the under side of the top board so as to be substantially rigid therewith. The bore extends completely through the head 11 and is reduced as at 16 and again reduced at its lower end as at 17. The surface 18 between the bores 16 and 17 is formed on the arc of a sphere and a ball 19 is located in the bore 16, which ball is substantially the same size as the bore 16 having its bearing on the shoulder 18. Pin 20 extends through the opening 17 and is much smaller than this opening and has a forced fit with the ball 91 allowing rocking motion laterally of the axis of the head and bore in a swivel-like fashion.

Bobbin holding member 21 comprises a body 22 having an opening 23 therein to loosely receive the pin 20 and having a plurality of arms 24 extending downwardly from the body being one piece with the body and bent therefrom. The arms extend generally at right angles to the body for a portion of their extent as at 25, then flare outwardly as at 26, and then inwardly as at 27, and then downwardly as at 28 substantially parallel to the axis. The portions 28 are generally pointed or so shaped that when the arms are contracted as shown in Figure 4, these ends will nest together as shown at 29 in Figure 5. The arms are arcuate and concave toward the center or axis as at 30 (see Figure 3), while they are convex as at 31 on their outer surface. The edges of the arms along their parallel portions 25 are notched as at 32, 33, and 34 for the reception of a disc or ring 35 which may be located in the desired set of notches 32, 33, or 34 so as to vary the effective spring tension of the arms 24 as may be desired, it being understood that with the ring absent, the arms will flex from their bend 36, whereas if the ring is inserted in one of the notches, the free ends of the arms will then flex from the location of the ring as a fulcrum point and be correspondingly stiffened by reason of the shorter arm and thus less leverage for moving the same than would occur should the fulcrum point be at the location of the bend 36, it being understood that the arms must flex inwardly as shown in Figure 4 as the bobbin holding member is inserted through the bore 37 of the bobbin 38 prior to its arrival at the larger portion 39 of the bore to engage beneath the shoulders 40 of the bobbin. The points 29 serve to assist in making this possible.

An abutment 41 is provided on the pin 20 which engages the anti-friction washer 42 formed of some anti-friction material such as nylon, "Teflon," which is a polytetrafluoroethylene, or a composition of "Teflon" and glass. This abutment 41 is made small so as to reduce resistance of the bobbin holding member 21 to turning with the bobbin. Relative rotation is between washer 42 carried by member 21 and the abutment 41. The ball 19 does not rotate with the bobbin. The lower end of the head is rounded or cut away as at 51 so as to allow full rocking movement of the pin 20 by reason of its ball mounting 19. Thus in forcing the bobbin on to the holder 21, should there be a force out of line with the axial center of the bobbin, the contact of the face 22 of the holder with the rounded end 51 of the head will be at a location to better support a thrust of this character.

The bobbin will have wound on it a package 45 and as the yarn is drawn from the outer surface of the package 46, the turning force will be a multiple of the pulling force times the distance 47 that the yarn is located from the turning axis of the bobbin. The resistance to this force which tends to turn the package will be the weight of the package multiplied by the co-efficient of friction between the abutment 41 and the washer 42 multiplied by the radius of the abutment 41, which radius I have designated by the arrow 48. Thus it will be apparent that in order to have a low resistance to turning, I will maintain the radius 48 as small as possible consistent with the necessary strength to support the parts, and to do this, the pin 20 will also be made small.

In order to assist in the provision of a lint free bearing, I provide a cover 49 which is slidable on the head 11 and closes the bore of the bobbin at the top, thus resting on the bobbin and turning with it. Further, I provide a flange 50 on the head, which will catch lint should it enter the bobbin opening.

In some cases the holding member may be as shown in Figure 6 having a base 22' with three arms 24' instead of the four shown in the other figures.

By the arrangement above referred to, the resistance to turning the package on the assembled bobbin and bobbin holder is substantially constant. When the yarn package is full, the radius 47 is the greatest in comparison to the radius 48. Thus, the ratio of these radii provides greatest leverage for turning when the weight of the package is the greatest. When the yarn package is the smallest, the radius 47 is smaller in comparison with the radius 48. Thus, the ratio of the radii provides less leverage for turning when the weight of the yarn package is the smaller. As the resistance to turning and the weight of the package always have the opposite relationship as to sizes, the result of the turning force required is always substantially the same.

I claim:

1. In combination with a bobbin having an open center, a pendant type bobbin holder comprising a head, means to fix the head to the under side of a creel board, a bobbin holding member having a body and adapted to grip the walls about the open center of the bobbin, a member swivelly suspended from said head and provided with a shoulder for engaging said body and providing therewith a bearing for rotatably supporting said bobbin holding member from said head, said bearing being located within said open center and below the upper end of said bobbin.

2. A pendant type bobbin holder comprising a head [of a size to extend into the axial opening of a bobbin], a member having a body with an opening therein and resilient arms extending from the body, a pin secured to said head and extending through said body opening and an abutment of small diameter secured on said pin on which said body rests and is rotatably supported.

3. A pendant type bobbin holder comprising a head [of a size to extend into the axial opening of a bobbin], a member having a body with an opening therein and resilient arms extending from the body, a ball rockably mounted on said head, a pin secured to said ball and extending through said body opening, and an abutment of small diameter on said pin on which said body rests and is rotatably supported.

4. A pendant type bobbin holder as in claim 3 wherein the end of the head is rounded to facilitate rocking of the bobbin holder relative to said head.

5. A pendant type bobbin holder comprising a head [of a size to extend into the axial opening of a bobbin], a member secured to said head and having a body, resilient arms extending from the body to grip the inner surface of the bobbin and means to vary the effective spring length of the arms.

6. A pendant type bobbin holder comprising a head [of a size to extend into the axial opening of a bobbin], a member secured to said head and having a body, resilient arms extending from the body to grip the inner surface of the bobbin, said arms each bulging outwardly and shaped at their ends to nest together to permit of maximum inward contraction.

7. In combination with a bobbin having an open center, a pendant type bobbin holder comprising a head, means to fix the head to the under side of a creel board, a bobbin holding member having means gripping the walls about the open center of the bobbin, a bearing swivelly mounted on said head for rotatably supporting said member from said head, said bearing being located within said open center and below the upper end of said bobbin, and a cap to rest upon the upper end of the bobbin to closely embrace the head and close the open center of the bobbin.

8. A pendant type bobbin holder comprising a head [of a size to extend into the axial opening of a bobbin], a member having a body with an opening therein and resilient arms extending from the body, a pin swivelly secured to said head and extending through said body opening and a bearing washer of small diameter on said pin on which said body rests and is rotatably supported, said body being provided with an anti-friction material engaging said abutment.

9. A pendant type bobbin holder comprising a head of a size to extend into the axial opening of a bobbin, a member secured to said head and having a body, resilient arms carried by the body to grip the inner surface of the bobbin, and means to vary the effective spring tension of the arms.

10. A bobbin holder as set forth in claim 9 wherein the arms have aligned notches, and said means to vary the effective spring tension engages in said notches.

11. A pendant type bobbin holder comprising a head [of a size to extend into axial opening of a bobbin], a member having a body and resilient arms to grip the inner surface of the bobbin, a support swivelly suspended from said head, said body being rotatably mounted on said support, said support having a larger surface area thereon engaged with said head than the surface area thereon engaged by said rotatable mount whereby the frictional resistance to rotating of said body on said support will be less than the frictional resistance to rotation of said support on said head.

12. A bobbin holder as set forth in claim 11 wherein said support is suspended from said head by a ball joint connection.

13. A pendant type bobbin holder as set forth in claim 11 wherein the support has a bearing washer on which said body rests and is rotatably supported.

References Cited in the file of this patent or the original patent

UNITED STATES PATENTS

| | | |
|---|---|---|
| 945,188 | Nichols | Jan. 4, 1910 |
| 1,692,441 | Hasbrouck | Nov. 20, 1928 |
| 1,805,495 | McKean | May 19, 1931 |
| 2,445,849 | Garey | July 27, 1948 |
| 2,632,613 | Hack | Mar. 24, 1953 |
| 2,668,018 | Hanse | Feb. 2, 1954 |